Feb. 22, 1966 H. KOCHALSKI ETAL 3,236,356
TRANSPORTING OBJECTS
Filed March 21, 1962 4 Sheets-Sheet 4

Inventors
Horst Kochalski, Willi Rudszinat,
Hans Suck, Ludwig Rode,
Harry David, Otto Erdmann
By Richard Ernst
Agt 3,236,356
TRANSPORTING OBJECTS
Horst Kochalski and Willy Rudszinat, Hamburg-Lohbrugge, Hans Suck, Hamburg-Neuengamme, Ludwig Rode, Neu-Bornsen, and Harry David and Otto Erdmann, Hamburg-Bergedorf, Germany, assignors to Hauni-Werke Körber & Co. K.G., Hamburg-Bergedorf, Germany, a company of Germany
Filed Mar. 21, 1962, Ser. No. 181,273
Claims priority, application Great Britain, Mar. 23, 1961, 10,676/61; Apr. 13, 1961, 13,294/61; Aug. 14, 1961, 29,241/61
16 Claims. (Cl. 198—31)

This invention relates to apparatus for transporting objects and also to a method of carrying out such transportation. Both apparatus and method are concerned with transportation in the course of large scale handling. The transportation of objects in accordance with the present invention is primarily intended to take place between a manufacturing or testing station and a packaging station, but may also be usefully employed between two manufacturing, testing, or packaging stations. The objects to be transported may be step products to be worked on further or final products to be tested or packed. For instance, the present invention deals with transporting cigarettes, filter cigarettes, so-called cigarette filter rods, cigars, cheroots, stogies, and objects other than smoking articles of elongated or any other shape. Wherever in this specification the terms "cigarette" and "cigarette machine" are used, they are meant to apply to other objects and other machines as well. As far as the drawings accompanying this specification are concerned, they show filter cigarettes but are intended to apply also to other cigarettes and entirely other objects.

The primary object of the present invention is to put objects, regardless of the manner in which they are discharged from a source, for instance, a manufacturing station, into such order as will best meet subsequent requirements. The invention offers extraordinary advantages when applied to the manufacture of cigarettes. Considering modern large scale production in many fields and especially in the cigarette industry, it will be appreciated that the foregoing object is a very important one.

Other important objects of our invention center about the elimination of intermediate handling operations, so far often at least partly performed by hand, and further mechanization of the manufacture of many articles.

More specifically, the present invention aims at doing away with particular devices disassociated from production machinery, which were used up to now to prepare mass-produced objects, for instance, for packaging. The apparatus of the invention prepares such objects, say, for packaging, while the objects are discharged from the respective manufacturing machinery, that is, at the manufacturing station. The apparatus of the invention disposes of the objects dealt with in groups of predetermined size and arrangement. Thus, the present apparatus does not involve merely transportation but disposal of objects as they are discharged at any station in a line of manufacture in such a manner as will be best suited for a subsequent operation.

In accordance with the present invention, the above referred to objects and such other objects as will appear hereinafter are achieved by providing apparatus which includes continuously moving conveying means to receive from a source the objects to be transported one after the other, and to take the objects along. The admittance end of the conveying means is adjacent to the discharge end, for instance, of a manufacturing machine or a testing device, so that discharged objects are successively received by the conveying means. The objects are ordinarily, but not necessarily, received in a spaced condition. Our apparatus further includes means to convert a "loose" row of objects into a "full" row, while the objects move along, means to relatively move the conveying means and objects of the full row apart, means to respond to the formation of a full row and to operate said relatively moving apart means, and plunger means reciprocatingly operable to eject moved apart objects to positions laterally of the conveying means.

According to one aspect of our invention, the aforesaid means which respond to the formation of a full row are constituted by means responding to a position assumed by at least a single object of the full row.

In a more specific embodiment, our apparatus includes further first stop means which are in the path of the moving objects and block a leading object. As the conveyor continues to move, spacedly supported objects following the leading object move on until any space that may have existed between adjacent objects disappears, the objects of a row engage each other, and the row comes to a standstill. Thus, a loose row is converted into what is referred to herein as a "full row."

The term "full row" as used in this specification and claims is primarily meant to cover a row of closely packed objects, which row, after it has come to a standstill, is ready to be disengaged from the conveying means and to be ejected substantially transversely of the conveying means. However, the term "full row" is also intended to apply to such rows as include objects in any desired order of succession. The term "loose row," on the other hand, applies to rows which include objects in a random succession. The objects of a loose row may or may not be closely packed and may, if spaced, be regularly or irregularly spaced.

It will be appreciated that compressible or easily deformable objects, such as cigarettes, must not be exposed to undue pressure. It is, therefore, a feature of the present invention to decrease or eliminate the frictional moving force of conveying means used, once a full row of closely packed cigarettes is formed. The frictional moving force has to be decreased at least to such an extent as will safely avoid any possible deforming action. While the apparatus includes the means for converting a loose row of objects into a full one, it also includes means for preventing the moving force to act unabatedly upon the objects of the full row once the full row is formed.

In order that this invention may be fully understood, illustrative embodiments are hereinafter described in detail, merely by way of example, and shown in the accompanying drawings in which.

Figure 1:
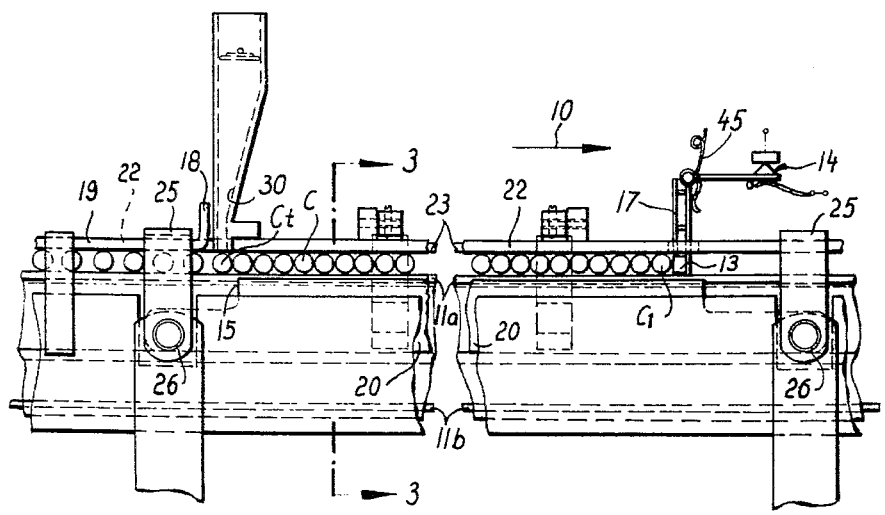
FIG. 1 is a schematic side elevational view of an apparatus embodying features of the invention.
Figure 2:
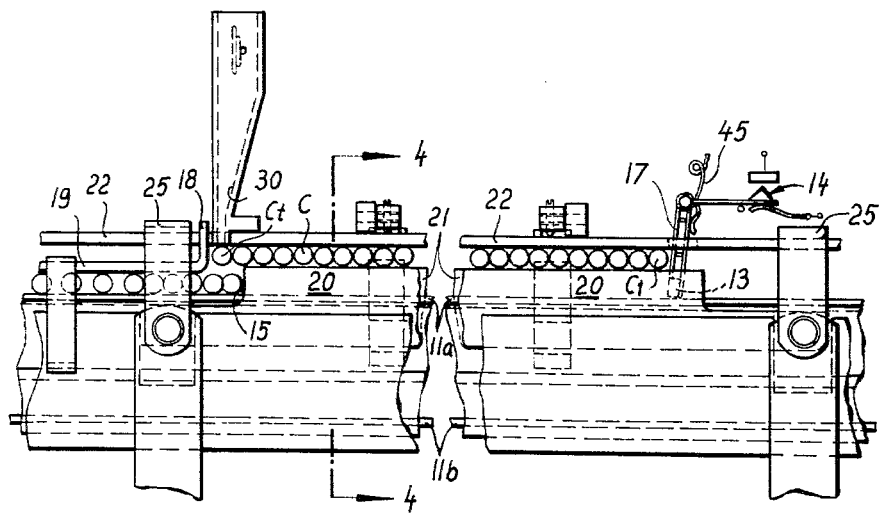
FIG. 2 is a similar view and illustrates a different operational condition of the apparatus or a different stage in the progression of the method of the invention.
Figure 3:
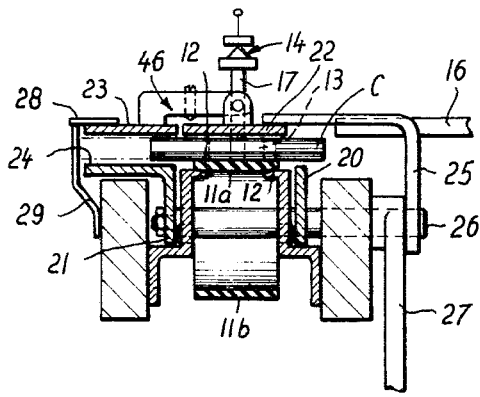
FIG. 3 is a vertical section taken in plane of the line 3—3 of FIG. 1.
Figure 4:
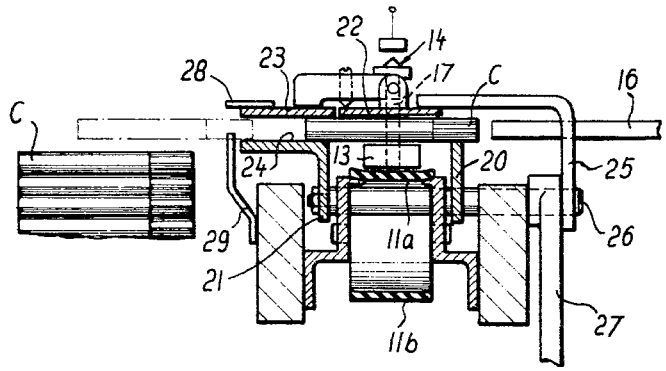
FIG. 4 is a vertical sectional view taken in the plane of the line 4—4 of FIG. 2.

Referring to the drawings in greater detail, and initially to FIGS. 1 to 4, an endless conveyor belt 11 is trained around supporting rolls (not shown). At least one of the rolls is driven. The supporting lap 11a of the belt moves in the direction of the arrow 10 shown in FIG. 1, and the return lap 11b moves in opposite direction. Filter cigarettes C are discharged, for instance, by a filter cigarette machine (not shown), and are received by the supporting lap. The conveyor belt has a width which is smaller than the length of the cigarettes, and the cigarettes are supported on the belt so that a portion at each cigarette end projects beyond the respective edge of the belt, as can be seen in FIGS. 3 and 4.

A conveyor belt, especially if formed of smooth plastic material, tends to curve crosswise when held at the required tension, and it is for this reason that the belt 11 is shown to be guided at its edges, at least in the region of the supporting lap, by guides 12 so that the outer surface of the supporting lap 11a will stay flat or even slightly concave when viewed toward the outer surface. Twisting and rocking of the cigarettes is thus avoided.

From FIG. 1 it will be seen that the cigarettes at and near the receiving end of the supporting lap, that is, on the left-hand side of the illustration, are in a spaced condition. The cigarettes are traveling first in such spaced condition. The spaces between adjacent cigarettes are ordinarily equal but may vary as well. On the exit side of the supporting lap is a stop 13 constituting what is referred to in the claims as "first stop means." The stop 13 is shown to be in the path of the cigarettes and to prevent cigarettes from moving beyond the stop. The function of the stop 13 is to bring first a leading cigarette $C_1$ and then a row of cigarettes behind the leading cigarette to a standstill. From FIG. 1 it will also be clear that the cigarettes on the conveyor belt, apart from those at and near the receiving end of the belt, are no longer in a spaced condition but in actual contact. This is due to the fact that as the spacedly supported cigarettes continue to travel on and with the supporting lap of the belt spaces between the cigarettes become smaller until the cigarettes touch each other and form a full row.

On the receiving side of the supporting lap is a stop 15 which is provided to temporarily intercept further transfer of cigarettes beyond the stop 15, when viewed in the direction of movement of the supporting lap and when the condition shown in FIG. 2 exists, as will be explained hereinafter. The stop 15 which is referred to in the claims as "second stop means" is provided at a distance from the stop 13, which corresponds approximately to the desired length of the full row to be formed.

It has been found that upon the formation of a fully packed row the moving force of the conveyor belt must no longer be transmitted to the objects of the row. Instead, it must be made ineffective either by elimination or at least by a reduction to such an extent that objects, such as deformable cigarettes, will not be subjected to deforming actions. The construction of FIGS. 1 to 4 provides that an otherwise deforming pressure be fully eliminated by moving cigarettes of the full row upwardly and away from the conveyor belt. It will be understood that such displacement puts the cigarettes out of reach of the force inherent in the traveling conveyor belt.

The exact length of the full row of cigarettes or the exact number of cigarettes in the full row to be dealt with further is defined on one side by the stop 13 and a first guide element 17 and on the other side by a second guide element 18. The cigarettes of the row between the stop 13 and the guide element 17 on one side and the guide element 18 on the other side, except for a cigarette designated $C_t$, are raised by two lifting rails 20, 21. These lifting rails are mounted for vertical reciprocation and operate outside the conveyor belt (see FIGS. 3 and 4). When moving upwardly, they engage from below the referred to projecting end portions of the cigarettes involved. In FIG. 3, the cigarettes are shown at the low level, and FIG. 4 shows the cigarettes at the raised level. The lifting rails 20, 21 extend parallel to the edges of the belt 11 (see again FIGS. 3 and 4) and are carried by supports 26.

When a row of cigarettes is raised, an ejecting device in the form of a plunger 16 which is shaped and mounted to reciprocate horizontally with some clearance between the guide elements 17 and 18 engages all the raised cigarettes endwise to eject same to positions laterally of the apparatus (see FIG. 4). It is to be noted that the plunger operates in the plane of the aforesaid raised level and transfers the raised row of cigarettes in a batch.

Also carried by the supports 26 are brackets 25 which, in turn, carry a cover plate 22. The cover plate 22 extends above and along the supporting lap 11a of the conveyor belt at a distance corresponding approximately to the thickness of a cigarette. The supporting lap and the cover plate form a transportation channel. The cover plate thus prevents the cigarettes on the conveyor belt from climbing upon others. A guide plate 23 is pivotally secured to the cover plate 22 along the edges 46. The supports 26 are mounted on pillars 27 which are vertically movable so that when the pillars move either upwardly or downwardly the lifting rails 20, 21, the brackets 25, and the plates 22 and 23 move along.

The cover plate 22 permits unimpeded transportation of cigarettes on the conveyor belt. To prevent the guide plate 23 from impeding the movement of cigarettes on the conveyor belt, it is held by a lug 28 which is fixed to a stationary bracket 29 in a position whereby the undersides of the guide plate and cover plate are in one and the same plane. However, for the ejection of cigarettes it is necessary to allow the guide plate 23 to swing somewhat downwardly to exert some pressure upon the lengthwise pushed cigarettes. The lifting rail 21 is of angle shape. A flange 24 of rail 21 extends outwardly. The guide plate 23 and the flange 24 form a channel for the cigarettes while being ejected.

The length of such parts of the rails 20 and 21, which engage portions of cigarettes from below and do the actual cigarette-raising, corresponds approximately to the length of the row of cigarettes to be raised first and ejected afterwards. The cigarette-engaging parts of the rails 20, 21 are shown, as can best be seen from FIG. 2, to be shorter than the raised row of cigarettes by a little more than the thickness of a single cigarette. It will be explained hereinafter why the length of the aforesaid cigarette-engaging parts and the length of the row of cigarettes to be raised and ejected approximate each other rather than being identical. For the time being, it is noted that the rails 20, 21 have raised parts whose length corresponds generally to the desired length of the row of cigarettes, or to the desired number of cigarettes, to be ejected at any one time. If cigarettes are to be filled in a tray, the length of such raised parts will correspond to the internal length of the tray.

According to the construction of FIGS. 1 to 4, the lifting rails 20, 21, cover plate 22, and guide plate 23 perform upward strokes which are longer than would be necessary just to obviate deforming actions. The length of their strokes is such as to make room for fresh cigarettes to move on toward the stop 13.

The stop 13 is operatively connected with a spring 45 which actuates a switch 14 (see FIGS. 1 and 2). When the stationary cigarettes of a full row, as shown in FIG. 1, with the leading cigarette $C_1$ in front, bear against the stop 13 and a certain pressure is thus exerted upon the stop 13, the spring 45 acts upon the switch 14, and the latter operates a clutch (not shown) and initiates the upward movement of the support 26 and of all the parts mounted thereon, including the lifting rails 20, 21. The operation of the plunger 16 is automatically controlled in timed sequence relative to the actuation of the support 26. The cycle thus executed consists of the upward and downward movement of the support 26 and the parts associated therewith, and the forth and back movement of the plunger 16.

If desired, switch means may be provided to respond to the position of a single cigarette in a full row or to the positions of a number of cigarettes, whereby, in the latter case, such switch means are all connected in series so that the circuit is only completed when the last cigarette of the group is in place. Also, a photo-electric sensing element may be provided to act when a certain cigarette or certain cigarettes of a full row are in proper position.

If it is desired not to eject as many cigarettes as could be accommodated behind the stop 13 but to provide that a smaller number in spaced condition be raised and ejected at any one time, spacer elements may be provided, for instance, on the underside of the cover plate 22. In this case, the cigarettes will no longer be brought into direct contact with one another. Yet, cigarettes which may have been unevenly spaced, when received on the conveyor, will be evenly spaced by the spacer elements and will finally be ejected in an evenly spaced relationship.

The stop 15 which is shown to be constituted by offset faces of the rails 20, 21 prevents, as has already been indicated, the conveyance of further objects or cigarettes into the reach of the plunger 16 while the plunger ejects the row of cigarettes, which has been raised before. At the same time, the stop 15 allows freshly oncoming cigarettes to accumulate, as can clearly be seen from FIG. 2, so that the formation of the next full row of cigarettes is commenced during the ejection of the previously raised row. Upon completion of the ejection, the lifting rails 20, 21 return to their lower position and allow the cigarettes already collected and also freshly oncoming cigarettes to proceed on the conveyor belt until the leading cigarette of the fresh row hits the stop 13 and the collection of a fresh full row is completed. The stop 15 offers the advantage that by allowing cigarettes to accumulate, a fresh full row is quickly formed. It will be understood that a stop functioning like the stop 15 may be formed as an independent member as well, rather than being formed as a part of the lifting rails.

The cover plate 22 is provided at the end near the stop 15 with a suction port 30 or a row of such ports, with the row extending transversely of the conveyor belt. The suction port serves to hold a trailing cigarette $C_t$ of the full row and is located so as to make sure that the drawing action of the suction port is not interfered with by the guide element 18. In other words, if a cigarette at the end of a row is not to be raised, it will be prevented from doing so by a guide member 19 and the guide element 18 into which the guide member 19 terminates.

It is also possible to provide that a fresh full row of cigarettes be formed while a previously raised row is being ejected, rather than collecting a few cigarettes only for the next full row. From FIG. 4 it can be seen that in the construction of FIGS. 1 to 4 the rails 20 and 21, while in the raised position, do not permit cigarettes to move on and a fresh full row to form. However, with rails which can be swung out of the way of moving cigarettes, a fresh full row can form during the ejection of a previously raised row. For this purpose, both rails are made of angle shape and are provided with a vertical section and an inwardly directed horizontal flange. The horizontal flanges support and raise cigarettes, while the vertical sections are at their free edges both reciprocatingly and pivotally secured to supports so that the rails may after the lifting movement be swung outwardly and lowered to be swung back at the lower level and to support a freshly formed full row. This swinging arrangement of lifting rails furthers high speed operation.

The same purpose is served if angle-shaped rails are used, the vertical sections of which are normally at a distance from each other, that is greater than the length of the cigarettes being transported. Both rails have inwardly directed flanges to support the cigarettes. From FIG. 4 it is clear that cigarettes cannot move beyond the stop 15 while the rails 20, 21 are in their raised position. However, with vertical rail sections which do not interfere with the movement of cigarettes, a fresh full row can form while the rails are in the raised position and the ejection of a previously raised row takes place. In this case, it is necessary to make the rails also movable in the directions of the axes of cigarettes so that they can be moved further apart before they reach the lower level to permit the rail flanges to avoid the row of cigarettes freshly collected and to support the fresh row from underneath.

When cigarettes are fed in a more or less closely packed condition onto a conveyor, there is no need for allowing the pressure exerted by a leading cigarette upon stop means to rise and to operate switch means and lifting rails. Instead, lifting rails and a plunger are simply operated in a predetermined sequence.

To make sure that the cigarettes of a closely packed row, once such row is present, will not be exposed to deforming forces the conveyor and the cigarettes, as has already been indicated, relatively move apart. For this purpose, the conveyor may be lowered, or the cigarettes raised. As has been explained, the cigarettes may be raised so as to give room to further cigarettes to move on and to form a fresh full row, whereby the formation of the fresh full row takes place while the previously formed row is raised and ejected and the reciprocatingly arranged parts of the apparatus are lowered. However, the movement of cigarettes of a full row need not make room for the continued movement of fresh cigarettes. The cigarettes may only slightly be raised from the conveyor so that the cigarettes or a number of cigarettes of a fresh full row are being collected in alignment with the previously formed full row while the latter is being ejected.

FIGS. 5 to 10 illustrate constructions whereby cigarettes which are to be ejected are only slightly raised from the conveyor.

Figure 5:
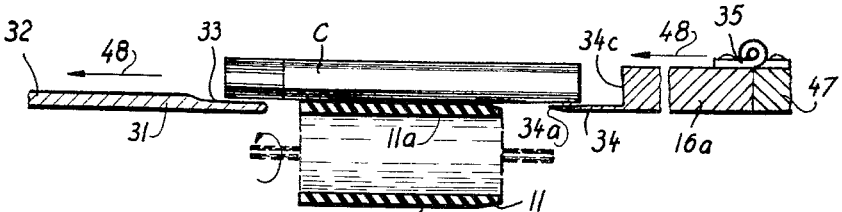
FIGS. 5 and 6 are sectioned elevations of modified details, each of the two views showing a different operational condition.
Figure 6:
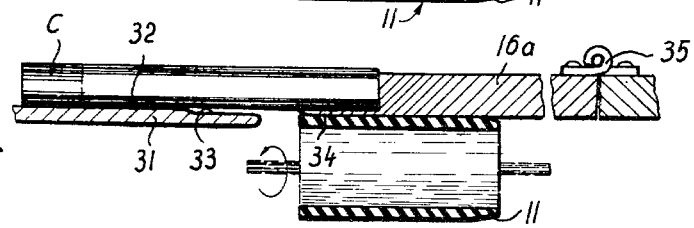

Having reference especially to FIGS. 5 and 6, a guide member 31 has a top surface 32 that lies above the conveyance plane or top surface of the supporting lap 11a of the conveyor 11, and a rear end part 33 directed toward the conveyor. The part 33 is downwardly curved to the level of the aforesaid conveyance plane or to a level slightly lower. A plunger 16a has a forwardly projecting part 34 and is shown to be pivotally secured to a carrier 47 at 35. On moving the plunger 16a in the direction of the arrow 48, that is, in the direction of the ejection of a row of cigarettes C, a tapered forward end portion 34a of the plunger part 34 enters between the supporting lap 11a and the cigarettes supported thereon, and the part 34 comes to lie underneath portions of the cigarettes at their trailing ends. The front 34c of the plunger pushes the cigarettes forward. The part 34 causes rear portions of the cigarettes to rise. As the leading ends of the cigarettes slide over the part 33 of the guide member 31 and reach the top 32, the front portions of the cigarettes are raised. The height of the rise at the front and rear of the cigarettes is the same, making the cigarettes in their entire length rise from the conveyor belt at the moment that the front 34c of the plunger strikes against the rear ends of the cigarettes and the cigarettes start moving laterally. The part 33 of the guide member 31 and the plunger portion 34 correspond, as far as their function is concerned, to the lifting rail 21 and 20 of FIGS. 1 to 4, respectively. No means like those used for lifting and lowering the lifting rails 20, 21 are needed in the modified construction of FIGS. 5 and 6. It is simply by actuation of the laterally moving plunger 16a, due to the provision of the parts 33 and 34 and the pivotal mounting of the plunger, that the cigarettes are raised. The pivotal mounting of the plunger permits a slight swinging movement of the part 34 when entering between conveyor belt and cigarettes to accommodate the thickness of the part 34.

Figure 7:
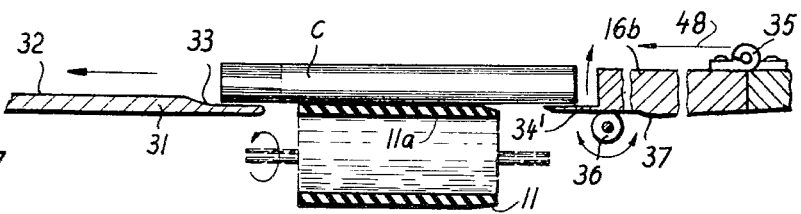
FIGS. 7 and 8 are similar to FIGS. 5 and 6 and show other modifications of details.
Figure 8:
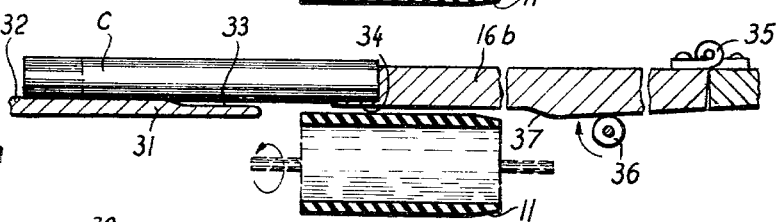

In the embodiment of FIGS. 7 and 8, a plunger 16b has a forwardly projecting part 34' and a bottom surface having a camming curve 37. On moving the plunger in the direction of the arrow 48, the cam 37 rides over a cylindrical roller 36 mounted to rotate in both directions, or a guide rod (not shown), and causes the part 34' and rear portions of cigarettes C to rise. The front end portions of cigarettes are raised in the same way has been explained with respect to FIGS. 5 and 6. Again, the cigarettes are raised clear of the supporting lap 11a of the conveyor belt before the ejection movement sets in. Instead of the cylindrical roller 36 and the cam surface 37 of the plunger 16b a plunger as shown in FIGS. 5 and 6 may be used to cooperate with a cam (not shown).

Figure 9:
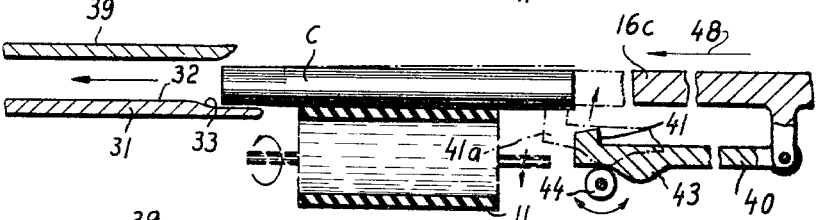
FIGS. 9 and 10 are again similar to FIGS. 5 and 6 and show further modifications of details.
Figure 10:
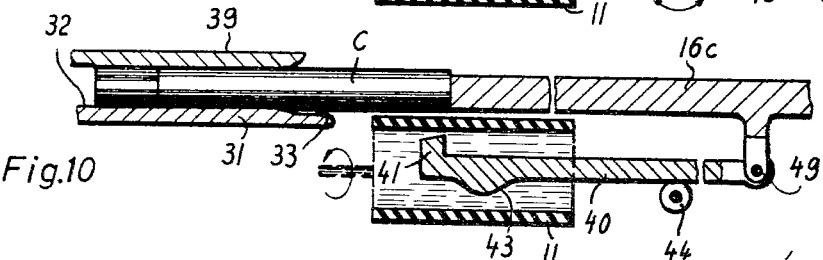

In the construction of FIGS. 9 and 10, a guide member 31 is shown to be associated with a parallel guide member 39. The two guide mmebers form a channel to guide the cigarettes during ejection. The plunger 16c has, at 49, pivotally mounted thereto a member 40. The latter has on its underside a camming bump 43, which cooperates with a cylindrical roller 44 or guide bar. At its free end, the member 40 has an upturned portion 41. As can be seen from FIG. 9, as the plunger 16c moves in the direction of the arrow 48, the cam 43 rides over the roller 44, which causes the end portion 41 of the member 40 to assume the dash-dot-line position 41a and to raise the rear end portions of a row of cigarettes which are being ejected. The front end portions of the cigarettes are raised by the rear end part 33 of the guide member 31. The front and rear ends of the cigarettes having been raised in this way, and cleared of the conveyor belt, the cigarettes are moved laterally through the channel formed by the guide members 31 and 39. The member 40, as can be seen from FIG. 10, enters between the supporting and return laps of the conveyor belt. When the reciprocatingly operated plunger 16c returns to its starting position, the underside portion 43 of the member 40 rides back over the roller 44 which is freely rotatable in both directions.

It is to be noted that in the constructions shown in FIGS. 5 to 10 or in similar constructions, where no lifting rails are used and no stop can be provided on one of the lifting rails, such as the stop 15 of FIGS. 1 to 4, the plunger may be provided or associated with a stop that prevents cigarettes from moving into the ejection area while an ejection takes place. Such stop acts as the stop 15 of FIGS. 1 to 4 does and permits collection or part collection of a fresh row of cigarettes, with the movement of the fresh row to commence again when the plunger has returned to its starting position. It will be apparent that fresh cigarettes move on until they come to a halt and a full row is formed and is ready for ejection.

It is believed that the construction and operation of the apparatus so far dealt with will be clear from the foregoing description. Some features of the invention are reviewed and some are listed hereinafter.

Rather than picking up varying numbers of cigarettes by hand, as they are discharged from a cigarette machine, to put the cigarettes in a storage container to be delivered from the container to counting or grouping and packaging devices, as has been done heretofore, our present invention makes it possible for the first time to control the formation of rows of cigarettes coming immediately from a cigarette machine, and to deliver same in a controlled fashion to packaging or other facilities. Our invention fully eliminates manual handling and does away with known devices, such as storage containers and chutes, which were used to perform both grouping and arranging. According to the invention, cigarettes are received on a moving conveyor belt, at whatever manufacturing or testing station they are discharged in the course of their manufacture, placed in any desired order, grouped, and readied for packaging. Cigarettes coming, for instance, from more than one cigarette machine may be collected on one and the same conveyor to be handled in accordance with our invention, that is, transported in form of a single loose row.

The conveyor is given a length that will allow the formation of the desired length of a full row of cigarettes or the desired number of cigarettes in a full row. It is the desired row length or the desired number of cigarettes and the conveyor, which are relatively moved apart to eliminate or reduce any pressure otherwise exerted upon cigarettes of a closely packed row, due to continued movement of the conveyor. If cigarettes are transported on a conveyor at a spacing, the number of cigarettes in a row to be raised and ejected will require a correspondingly greater conveyor length.

If the apparatus of the invention is used to fill cigarette trays, our apparatus is set up to correspond dimensionally to the cigarette tray or the cigarette tray must be chosen to conform to the apparatus. The invention offers the advantage of filling a tray layer by layer, with a predetermined number of cigarettes in each layer. The tray is arranged to perform a step-by-step downward movement to make it possible for the plunger to push a fresh layer upon a layer previously deposited. The downward movements of the tray take place in a timed relationship with respect to the reciprocative movements of the plunger. From FIG. 4 it will be seen that each layer is placed on top of the preceding layer.

To make it possible to deposit a layer of cigarettes so that each cigarette comes to lie above and between two cigarettes of the next lower layer, we place a filler either in one bottom corner or in each of the bottom corners of the tray to occupy a space or spaces to be held free of cigarettes. Such filler is shaped somewhat similarly to the cigarettes to be deposited in the tray. In the case of cigarettes, the space-occupying filler has a width corresponding to the radius of a cigarette, and a height less than the diameter of a cigarette, that is, about two-thirds of the diameter. With such a filler in one bottom corner or in both bottom corners of the tray, and with a layer of cigarettes at the bottom of the tray, the cigarettes of the next higher layer will readily arrange themselves in the desired staggered relationship with respect to the cigarettes of the bottom layer. In this manner, successive layers are deposited so that the cigarettes of each layer are slightly offset with respect to adjacent layers. This arrangement prevents cigarettes from rolling or being displaced and ensures the most economical utilization of space.

To assist correct placing of cigarettes or other objects in this staggered fashion, we provide for the lifting rails and the plunger to reciprocate in longitudinal directions by such small amounts as correspond to approximately the radius of a cigarette.

Trays may be filled in this way with filter rods and any other objects and moved to any place for further handling. Smaller or larger blocks of objects may be obtained in the same way, for instance, blocks of twenty cigarettes as contained in the commonly marketed packs of cigarettes.

Instead of forming a single full row of cigarettes more than one row may be formed by spacedly introducing more than one stop in the path of moving cigarettes. Such stops which serve as first stop means block individual cigarettes of a loose row and allow a continuously moving conveyor to convert the loose row into as many full rows as there are stops. The full rows may in any suitable way be disengaged from the conveyor and then transversely ejected.

If objects of varying diameter are to be collected in a full row, we provide spacer elements which conform to the largest occurring diameter, which makes it still possible to form rows of identical numbers.

It is an advantage of the present apparatus to perform smoothly and flawlessly even though used, for instance, after a cigarette testing device which discharges faulty cigarettes out of rows of cigarettes. As has been explained hereinbefore, a row of irregularly spaced cigarettes is converted into a regularly spaced or fully packed row both referred to as a "full row."

In FIGS. 1 and 2 pressure-sensing means are shown which respond to the pressure exerted by a fully packed row of cigarettes and cause objects of the row to be raised and ejected. It will be appreciated that no such pressure can be exerted by a spaced row. The invention, therefore, also provides position-responsive means which are acted upon by a single cigarette or more cigarettes of a full row whenever a certain position is assumed by the cigarette or cigarettes.

It will be apparent that if more than one full row is formed and if no first stop means are used which are pressure-responsive, then position-responsive means have to be provided to cause the several rows to be raised and ejected. This can be done, for instance, by electric switch means connected in series so that only when all the rows are complete the circuit closes to initiate raising and ejecting.

The guide member 19 shown in FIGS. 1 and 2 prevents cigarettes which are outside the row intended to be raised and ejected from being drawn up by the suction port 30. The guide element 18 which forms a part of the guide member 19 is a distance away from the stop 15, longitudinally viewed, which is shown to be somewhat larger than the diameter of a cigarette, thus making sure that the sucking action of the suction port will raise at least one cigarette, the trailing cigarette $C_t$, in addition to those cigarettes raised by the rails 20, 21.

Figure 11:
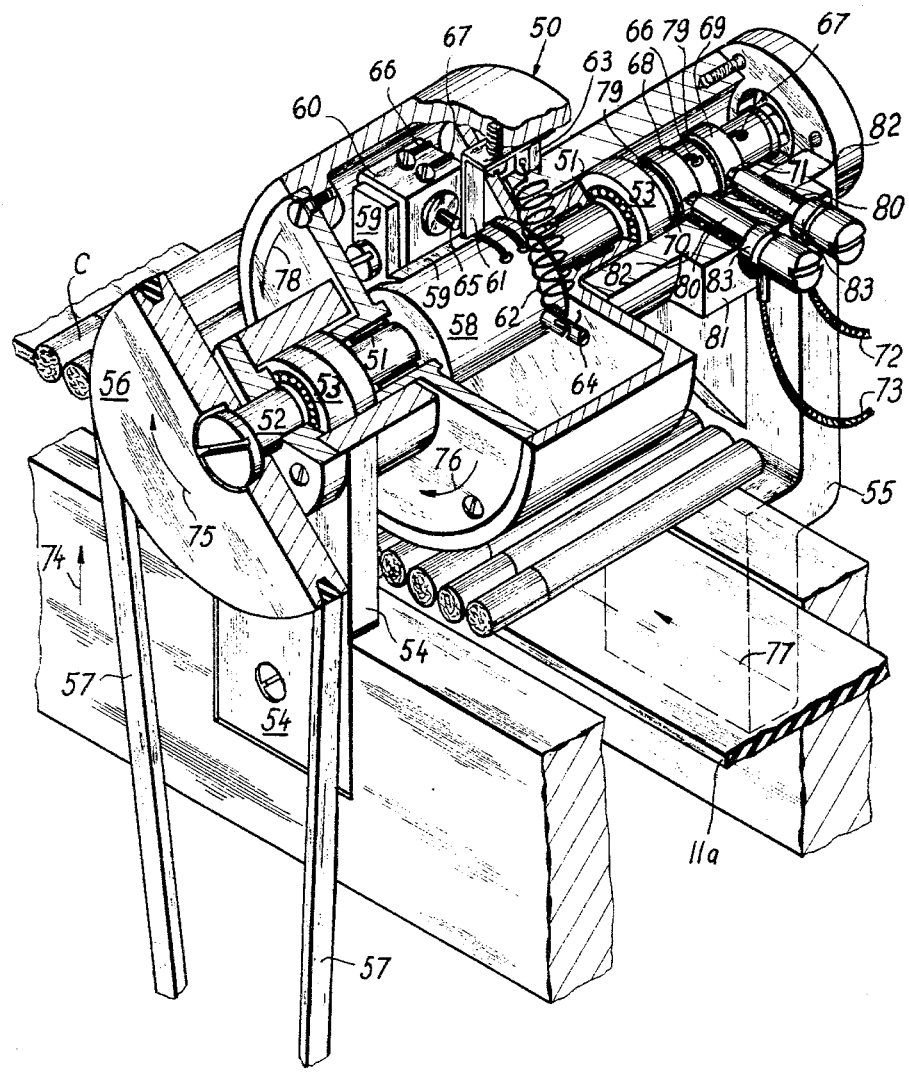
FIG. 11 is a perspective view of a detail.

Having now reference to FIG. 11, the supporting lap 11a of a conveyor belt transports cigarettes C in the direction of the arrow 77. Located above the lap 11a is a hollow roller 50 which is freely rotatable on a shaft 52 and carried in needle bearings 51. The roller 50 is dimensioned so as to slightly engage cigarettes on the lap 11a. The shaft 52 is rotatable in ball bearings 53 carried by supports 54 and 55. A V-belt pulley 56 is fastened on the shaft 52 and driven by a V-belt 57. A sleeve 58 is fixedly mounted on the shaft 52 within the roller 50 and carries a projecting part 59 which holds a switch 60. Thus, the sleeve 58 and the switch 60 rotate with the shaft 52. Internally of the roller 50 and fastened thereto is a striking plate 61. A coil spring 62 is fastened at one end, by means of a spring holder 63, to the striking plate 61, while the other end of the spring 62 is fastened to a pin 64 secured to and projecting from the sleeve 58. A pin 65 forming a part of the switch 60 extends into the path of the striking plate 61 when the roller 50 carrying the plate 61 rotates relative to and toward the switch 60. The plate 61 when striking against the pin 65 actuates the switch 60.

Leads 66 and 67 from the switch 60 pass through the sleeve 58 and shaft 52 and are connected to slip rings 68 and 69. The latter are engaged by brushes 70 and 71, to which external leads 72 and 73 are connected. The brushes 70 and 71 are carbon switches and slide in metal sleeves 80, 80 mounted on a support member 81.

The operation and purpose of the device of FIG. 11 are as follows: The belt 57 drives the pulley 56 and, hence, the shaft 52 and sleeve 58 in the directions of the arrows 74 and 75. It will be understood that the sleeve 58 and shaft 52 may be formed as a single piece. The rotative movement of the sleeve 58 is transmitted over the pin 64 and coil spring 62 to the striking plate 61 and roller 50, causing the roller to rotate in the direction of the arrow 76, which direction is the same as that indicated by the arrows 74 and 75. The peripheral speed of the roller 50 is somewhat greater than the speed of the conveyor belt, and as a result of the small difference in speed the cigarettes are helped to move on and to form a full row. When a full row is formed, the roller 50 which is not positively driven but taken along, as has been indicated, by the pin 64 on the sleeve 58, by means of the spring 62, is caused to carry out a small movement in the direction of the arrow 78 relative to the sleeve 58 and, therefore, also in relation to the switch 60 carried by the sleeve 58. This small movement of the roller 50 in the direction of the arrow 78 is a relative one since shaft 52 and sleeve 58 continue to rotate. The plate 61 then strikes against the pin 65 and actuates the switch 60, and the latter initiates a movement of a full row of cigarettes relative to the conveyor belt, or vice versa, and a lateral ejection of the row. As soon as a row of cigarettes has been ejected, the braking action previously effected upon the roller 50 by a full row of cigarettes is released, allowing the roller to resume its full rotational speed. The striking plate 61 disengages the pin 65, and fresh cigarettes are free to pass beneath the roller 50 in the course of the formation of a fresh full row.

It will be understood that if a full row of cigarettes is to be raised from the conveyor belt in order to be laterally ejected, the row may be ahead of the device shown in FIG. 11. When applied to a construction similar to that shown in FIGS. 1 to 4, the device of FIG. 11 may be provided either to the left of a stop, such as stop 15, or to take the place of the stop 13. It will be seen from the foregoing description that the device of FIG. 11 is an example of what is broadly referred to as a position-sensing device, and thus the device is an indispensable part of the apparatus of the invention.

It will be apparent that while we have shown and described our invention in a few forms only, many changes and modifications may be made without departing from the spirit of the invention defined in the following claims.

We claim:

1. An apparatus for transporting elongated rod shaped objects, comprising continuously moving conveying means arranged to receive said objects one after the other and to take said objects along in a substantially horizontal plane and in form of a loose row in which the longitudinal extensions of the objects are perpendicular to the direction of movement of said conveying means, said conveying means comprising an endless belt having a supporting lap for said loose row of objects, means to convert said loose row into a full row of objects while the objects move, means to stop objects of said full row, means to relatively move said lap and objects of said full row apart in a direction at right angles to said horizontal plane, said last named means comprising lifting means arranged to engage from below objects of said full row in places unsupported by said lap and said lifting means being mounted for vertical reciprocation between a normal or lower position and said moved apart or raised position, covering means supported to extend above and along said lap and to take part in the reciprocation of said lifting means, means to respond to a position assumed by at least a single object of said full row and to operate said lifting means, and plunger means reciprocatingly operable in a substantially horizontal plane at the level of said moved apart or raised position to eject moved apart objects in the longitudinal direction thereof to positions laterally of said conveying means.

2. An apparatus according to claim 1, further comprising reciprocatingly mounted support means for said lifting and covering means, said control means comprising a switch system to respond to the conversion of said loose row into said full row and to initiate reciprocation of said support means and thus of said lifting and covering means.

3. An apparatus according to claim 1, wherein said covering means is provided with suction port means located in proximity of a trailing object of said full row of objects, said suction port means being adapted to draw at least a single object to the level of said moved apart or raised position.

4. An apparatus according to claim 1, further comprising guide means pivotally and laterally secured to said covering means on the side toward which said moved apart objects are ejected, and fixed abutment means to hold said guide means clear of objects on said supporting lap while said lifting means are in said normal or lower position, to clear said guide means while said lifting means are in said moved apart or raised position, and to help guide said moved apart objects during ejection.

5. An apparatus according to claim 4, wherein said lifting means comprises two rails extending alongside the edges of said lap, the rail on the side toward which said moved apart objects are ejected having a flange extending in the direction of the ejection, said flange and said guide means forming a guide channel for the objects being ejected.

6. An apparatus for transporting cigarettes and similar deformable elongated rod-shaped objects from a source, comprising stop means, spaced from the source; continuously moving conveying means extending from the source to said stop means and arranged to receive objects seriatim and to transport such objects sideways toward said stop means in the form of a loose row so that the foremost object engages said stop means while being transported by the conveying means and is arrested by the stop means whereby the remaining objects of the loose row abut against the foremost object and against each other to form a full row; friction reducing means for moving said conveyor means and the full row of objects with reference to each other substantially at right angles to the direction of travel of said conveying means; control means arranged to respond to a position assumed by at least a single object of the full row to operate said friction reducing means only upon completion of the full row; and ejecting means for moving the full row of moved apart objects lengthwise to a position laterally of said conveying means.

7. An apparatus as set forth in claim 6, further comprising second stop means provided in the proximity of the trailing object of a full row to temporarily intercept the objects which follow the trailing object.

8. An apparatus as set forth in claim 7, further comprising first and second guide means arranged to be engaged respectively by the foremost and the trailing object of a full row and to guide said objects during shifting by said ejecting means.

9. An apparatus as set forth in claim 7, wherein said friction reducing means comprises lifting means movable between raised and lower positions and wherein said stop means is arranged to intercept the objects which follow the trailing object of a full row when the lifting means is moved from said lower position thereof.

10. An apparatus as set forth in claim 6, wherein said conveying means comprises an endless belt having a supporting lap and means to support the edges of said supporting lap.

11. An apparatus as set forth in claim 6, wherein said friction reducing means comprises lifting means movable between raised and lower positions and arranged to engage from below the objects of a full row during movement to said raised position, said ejecting means being operative at the level of the lifting means in said raised position thereof.

12. An apparatus as set forth in claim 11, wherein said conveying means comprises an endless belt having a width less than the length of said objects and wherein said lifting means comprises two rails extending alongside the edges of said belt.

13. An apparatus as set forth in claim 11, wherein said ejecting means comprises a plunger having a length substantially corresponding to the length of a full row of objects.

14. An apparatus as set forth in claim 6, wherein said control means comprises resiliently mounted sensing means arranged to respond to pressure transmitted by a full row of objects and operatively connected with said stop means, and switch means arranged to be actuated by said sensing means to initiate the operation of said friction reducing means and said ejecting means.

15. An apparatus as set forth in claim 6, wherein said control means comprises rotary sensing means arranged to respond to accumulation of a full row of objects adjacent to said stop means, and switch means actuated by said sensing means upon assembly of a full row to initiate the operation of said friction reducing means and said ejecting means.

16. An apparatus as set forth in claim 6, wherein said friction reducing means comprises stationary lifting and supporting means and second lifting and supporting means provided on said ejecting means, said lifting and supporting means being arranged to engage the objects of a full row from below and to raise such objects prior to shifting.

References Cited by the Examiner

UNITED STATES PATENTS

| 720,150 | 2/1903 | Ingleby | 198—24 |
| 2,470,795 | 5/1949 | Socke | 198—21 X |
| 2,678,151 | 5/1954 | Geisler | 198—21 X |
| 2,933,207 | 4/1960 | Edmonds. | |
| 3,025,979 | 3/1962 | Segur. | |

FOREIGN PATENTS

| 641,978 | 2/1937 | Germany. |

SAMUEL F. COLEMAN, *Primary Examiner.*

EDWARD A. SROKA, WILLIAM B. LA BORDE,
*Examiners.*